UNITED STATES PATENT OFFICE.

JOHN F. A. NIEPRASCHK, OF CHICAGO, ILLINOIS.

METHOD OF ORNAMENTING METAL SURFACES.

SPECIFICATION forming part of Letters Patent No. 578,417, dated March 9, 1897.

Application filed May 11, 1896. Serial No. 591,151. (No specimens.)

*To all whom it may concern:*

Be it known that I, JOHN F. A. NIEPRASCHK, a citizen of the United States, residing at Chicago, in the county of Cook and State of Illinois, have invented certain new and useful Improvements in Methods of Ornamenting Metal Surfaces, of which the following is a specification.

My invention relates to the method of ornamenting sheet-metal surfaces which will produce a mottled surface of varied and attractive designs, and the material so prepared is adapted for many purposes, such, for instance, as for covering woodwork, paneling, or for stove-boards.

Heretofore painted surfaces have been spattered with a "gummy substance" mixed with turpentine and then rubbing dry coloring-matter upon the gummy substance, and also freshly-varnished surfaces have been spotted or marbled by dropping or sprinkling colors from a brush in any suitable manner and allowing the paint-spots to assimilate or flow into the varnish until they have assumed a uniform level and become dry. These processes require time and skill and cannot be executed with the same uniformity of finish, neither can colors be blended and other unique effects be produced, as are obtainable by the process and materials employed by me, and which will be fully understood by the following specification of my invention in detail.

I first prepare the surface of tin or sheet metal with a background or coat of any oil-color which will stand the heat of a drying-oven. Then bake or dry the colored background thoroughly. Then cover with an even smoothly-surfaced coat of varnish, and the surface is immediately ready to receive the spatter-work. The spatter material consists of a dry coloring powder or bronze mixed with benzin, gasolene, or any like products of hydrocarbon oils, and when thoroughly mixed to flow easily out of the brush is applied to the surface prepared with the groundwork, as above described, by spattering or brush-sprinkling in a well-known manner and allowed to dry. The dry color carried by the benzin flows in rings, circles, and irregular spots of varied color over the prepared surface and when thoroughly dried by exposure may be again varnished, if desired, to give it a highly-finished surface, although the last coat of varnish is not necessary to the carrying out of my invention.

I prefer to mix with the first coat of varnish which is applied to the groundwork a very small quantity of color. For instance, the groundwork being blue, a very small quantity of red color is mixed with the varnish, and the color contained in the spatter mixture will then blend and assimilate with the color of the varnish and produce variegated and blended colors of many hues.

The benzin or hydrocarbon oils are superior to other oils, as better effects in blending colors are obtained and the settling of the spatter-spots produces better results than with other material.

The benzin or gasolene will etch or eat into the ground-color and thus produce around the center spot and inside of the peripheral lines or rings of the spatter-work a lighter or faded band of radial granulations or iridescent rays of delicate and uniform tracery, as in crystallized substances or by frosting, such as cannot be produced by bronze or dry coloring-powder mixed with turpentine or other mediums heretofore used. The action of the gasolene or benzin upon the varnished surface will reduce the thickness of the film in irregular lines and rings, thus producing an iridescent or crystalline effect, and when various colors are blended with the varnish and spatter liquid fine striations, as those seen in mother-of-pearl, are produced. Besides, the gasolene or benzin will flow freely from the brush and will retain a more even and easily-regulated consistency than by the use of other oily or gummy mediums. A fresh quantity of oil or powder may be added to the spatter mixture at any time to produce the fine liquid fluency of color which is essential to the perfect accomplishment of my invention. One piece of work may thus easily be matched with another, and with ordinary skill the entire operation may be performed very rapidly to produce such surfaces uniformly of a high grade and finish.

When metal plates are thus prepared, the coating will permanently adhere thereto, and the plates may be crimped, stamped, bent, or otherwise worked by hand or by machinery without marring its surface.

I am aware that turpentine in which a gummy substance has been dissolved has been sprinkled upon a dry painted surface and when partially dry has been rubbed with dry coloring-matter, and also that wet varnish or tacky surfaces upon a dry painted ground have been sprinkled or spattered with a different color, and I do not claim such method or methods, as the materials and methods employed by me produce an article differing materially in its ornamental effects from these and other effects heretofore produced.

I claim as my invention and desire to secure by Letters Patent—

1. The improvement in ornamenting metal surfaces consisting in coating the metal with a priming of oil-colored paint, and thoroughly drying the same, then applying a surface coat of varnish, and finally sprinkling the surface while wet with benzin or its equivalent hydrocarbon product, mixed with dry color as bronze, as herein described.

2. The improvement in ornamenting surfaces consisting in coating the metal with background of paint, and thoroughly drying the same, then applying a surface coat of varnish slightly colored, of different shade or tint from that of the background, and finally sprinkling the surface while wet with a different mixed color or bronze spatter liquid to blend with the color of the varnish, as herein described.

In testimony that I claim the foregoing as my invention I have signed my name in the presence of two subscribing witnesses.

JOHN F. A. NIEPRASCHK.

Witnesses:
W. H. ROWE,
EFFIE STINEBECK.